United States Patent Office 2,743,223
Patented Apr. 24, 1956

2,743,223

ORGANIC COMPOUND BOND RUPTURING PROCESS

Leslie T. McClinton, Chicago, Ill., Warren M. Garrison, Walnut Creek, Calif., and Milton Burton, Mishawaka, Ind., assignors to the United States of America as represented by the United States Atomic Energy Commission No Drawing. Application August 23, 1946, Serial No. 692,728

1 Claim. (Cl. 204—154)

This invention relates to a novel method of rupturing the bonds of chemical compounds and thereby cracking the compounds. The term cracking as herein contemplated is intended to include the rupture of chemical bonds, particularly carbon-carbon and carbon-hydrogen bonds, existing in compounds such as carbon compounds with consequent production of radicals, compounds or free elements of lower molecular weight (or atomic weight) than the compounds from which they are derived.

In accordance with the present invention, it has been found that hydrocarbons and substituted hydrocarbons containing carbon-carbon and carbon-hydrogen bonds may be cracked to produce compounds of lower molecular weight and/or to release hydrogen by bombardment with high energy neutrons. The product of such cracking may be recovered as such or may be further treated during or after bombardment to produce other compositions by recombination, rearrangement or other mechanism.

The process of cracking herein contemplated may be carried out by bombarding the compounds with high energy neutrons having energies well above the binding energy of chemical bonds to be ruptured. Since the neutron has a mass well below the mass of most of the molecules to be cracked, the energy of the neutron must exceed the binding energy of the bond to be ruptured by at least the minimum energy retainable by the neutron after collision with the atomic nucleus involved. Thus to rupture an aliphatic carbon-hydrogen bond, the neutron should have an energy of at least 5 electron volts and preferably at least 10 electron volts; and to rupture a carbon-carbon bond, the neutron should have an energy of at least 12 electron volts, and preferably at least 50 electron volts. For effective radiation to produce substantial yields within a reasonable period of time, the energy of the neutrons used should not be below about 1000 electron volts and preferably should exceed 100,000 electron volts unless the use of a mono-chromatic beam of neutrons for selective bond rupture as hereinafter described is considered essential. Especially advantageous results are obtained by subjecting organic compounds to the irradiation generated by a neutronic reactor. Fast neutron or slow neutron reactors may be used for this purpose.

Suitable slow neutron reactors in which the irradiation may be conducted are described in United States Letters Patent, No. 2,708,656 issued to Enrico Fermi and Leo Szilard and Application Serial No. 623,363, filed October 19, 1945, by Robert Christy. Such reactors comprise a fissionable isotope such as $U^{235}$, $U^{233}$, or $94^{239}$ disposed in a neutron moderator such as deuterium oxide, water, beryllium or carbon.

Neutronic reactors operate by fission of atoms of a fissionable isotope. These atoms, upon absorption of a neutron, fission or break up into fragments of lower mass including heavy fragments having atomic numbers approximately within the range 51 to 61 and lighter fragments having atomic numbers approximately within the range 35 to 46. In addition to the fragments, several fast neutrons having energies of several million electron volts are given off for each fission and substantial energy is released usually in the form of heat. The reactor is maintained in operation by establishment of a self-sustaining chain reaction wherein neutrons evolved from fission of one atom are made available for fission of more than one other atom and the chain reaction is permitted to increase in rate until a desired rate of reaction has been attained whereupon the reaction is controlled at a steady state at this level and the evolved heat removed by suitable coolants such as air, water, steam, liquid bismuth, etc.

Radiation generated within a neutronic reactor includes fast and slow neutron, beta, and gamma radiation. Where a neutron moderator is used in the reactor the energies of the neutrons will vary from several million electron volts to thermal energies (about 0.03 electron volt). Where little or no moderator is used, the energies of the neutrons may be largely above 100,000 electron volts. In any case, matter inserted in a neutronic reactor will be exposed to intense irradiation of neutrons having energies above 1000 to 100,000 electron volts as well as to thermal or slow neutrons, gamma and beta radiation.

In effecting irradiation of the compositions herein contemplated, the compositions may be introduced into the interior of a reactor as, for example, in a well designed for that purpose or through a cooling tube or tubes. Where it is found desirable to expose the composition to fast or high energy neutrons only, and in the substantial absence of beta and gamma irradiation, the irradiation may be conducted exteriorly of the reactor using, for example, a collimated beam of fast neutrons. Such a collimated beam may be secured as described in the above-mentioned Fermi-Szilard patent by insertion of a hollow shaft or tube extending into the central portion of the reactor. Gamma rays may be screened from the fast neutron beam by means of a bismuth metal sheet extending across the path of the beam.

The carbon compounds to be treated may be introduced into the reactor or into the path of the fast or high energy beam in a continuous flow through a conduit, or may be placed in a receptacle in the reactor or in the path of the beam and subjected to irradiation while they are substantially static. In such a static process, the compound to be bombarded may be maintained in the reactor or neutron field and the products such as gaseous or other products of reaction such as hydrogen, methane, etc., may be withdrawn during the bombardment substantially as formed.

Generally speaking, it has been found that as a consequence of high energy neutron bombardment or bombardment in a neutronic reactor of organic carbon-hydrogen compounds a number of reactions occur. As a predominant reaction when a hydrocarbon is treated, lower molecular weight products including hydrogen and gaseous or liquid hydrocarbons are evolved. If the irradiation is sufficiently intense and is continued long enough, the end products may be hydrogen and methane or carbon. However, hydrocarbons between methane and the hydrocarbon bombarded may be secured by removing the product of the bombardment from the neutron field before further breakdown can occur.

During this cracking operation or as a consequence thereof some higher molecular weight products also are secured. It seems entirely possible that these higher molecular weight products result from secondary reactions involving polymerization of gaseous or liquid unsaturated products or combination of free radicals, after their initial production, with each other, with the initial charge material, or with intermediate products.

The exact nature of the reactions resulting is not known and it is not intended that any theoretical explanation shall be binding. From a study of the effects secured as a result of exposure of the compositions herein contemplated to the high energy irradiation which is present in a neutronic reactor, it appears that the resulting reactions are propagated by the breaking of carbon-hydrogen and/or carbon-carbon bonds. For example, when a compound of the general structure $C_nH_{2n+2}$ is subjected to high energy neutrons, collisions between the neutrons and the atomic nuclei of the compound may be expected. A neutron having an energy above about 5 electron volts colliding with a hydrogen atom in such a compound may remove the hydrogen atom from the compound with the resulting production of a pair of free radicals according to the equation $$C_nH_{(2n+2)} \rightarrow C_nH^{\cdot}{}_{(2n+1)} + H^{\cdot}$$

the two radicals on the right hand side of the equation being free radicals.

Rearrangement of the free radical $C_nH^{\cdot}{}_{(2n+1)}$ may tend to occur in accordance with one or all of the following equations $$2C_nH^{\cdot}{}_{(2n+1)} \rightarrow C_nH_{2n} + C_nH_{(2n+2)}$$
$$C_nH^{\cdot}{}_{(2n+1)} \rightarrow H^{\cdot} + C_nH_{2n}$$

Moreover, the free radicals $C_nH^{\cdot}{}_{(2n+1)}$ and $H^{\cdot}$ and/or their reaction products may form other products by interaction with molecules undisturbed by the bombardment as, for example, in accordance with the following equation $$H + C_nH_{(2n+2)} \rightarrow CH_4 + C_{(n-1)}H_{2(n-1)+1}$$

The cracking process may be conducted at atmospheric pressure. Frequently it may be desirable to subject the compositions undergoing bombardment to pressures of the order of 100–300 pounds per square inch during the treatment.

The cracking operation herein contemplated may be carried out at room temperature. However, elevated temperatures frequently expedite reaction and, therefore, temperatures above 100° C., for example, 100–500° C. may be used. An advantage of the present process arises from the fact that it may be conducted at temperatures substantially below the pyrolytic decomposition temperature. Since the cracking may be conducted below those temperatures required in pyrolytic cracking processes, control of the process to secure desired results without undesirable carbonization or tarring is more easily facilitated. A further advantage of this process over pure pyrolytic cracking processes resides in the fact that in the bombardment of compounds with high energy neutrons at 100 to 500° C., chain reactions of greater length occur without undergoing a chain-terminating reaction than occur in other processes.

The products of the bombardment may be removed continuously or periodically from the product undergoing bombardment. For example, a liquid or gaseous hydrocarbon may be circulated through a neutronic reactor and the resulting products separated by fractionation and the uncracked fractions with or without fresh products recycled to the reactor. Conventional cracking, fractionating and distilling equipment wherein a neutronic reactor provided with passages for passage of the product to be cracked is substituted for the conventional pyrolytic cracking coils may be used to effect the processes herein contemplated. In the process involving treatment of liquid or solid hydrocarbons, both gaseous and liquid products of bombardment are usually produced. In such a case the evolved hydrogen or gaseous hydrocarbons may be separated easily from the liquid and/or solid products and the non-gaseous residue may be fractionated or used as such. Moreover, the gaseous hydrogen or hydrocarbons evolved may be mixed with additional solid or liquid hydrocarbons and again subjected to high energy neutron bombardment.

It will be understood that where the bombardment is conducted using neutrons having a wide band of energies, mixtures of products may be secured and various types of bonds ruptured. In accordance with a further embodiment of the invention, a selective rupture of chemical bonds may be secured by use of neutrons having specific energies. For example, selective rupture of carbon-hydrogen bonds without rupture of carbon-carbon bonds may be effected by conducting the bombardment using neutrons having energies of about 5 to 12 electrons volts, and preferably 10–12 electron volts. Preferential rupture of carbon-hydrogen bonds with only a small percentage rupture of carbon-carbon bonds may be effected with neutrons of somewhat higher energies.

A wide range of compounds may be treated as herein contemplated, particularly organic compounds which contain carbon-carbon and carbon-hydrogen bonds. Thus saturated aliphatic hydrocarbons such as ethane, propane, n-butane, isobutane, pentanes, octanes, nonanes, etc., or unsaturated aliphatics such as ethylene, vinylacetylene, propylene, isobutylene, n-butylene, butadiene, etc., or cyclic compounds including the aromatics and cycloparaffins such as benzene, toluene, naphthalene, diphenyl, anthracene, tetrahydronaphthalene, cyclohexane, p-cymene, diphenyl methane, triphenyl methane, cyclohexene, etc., may be cracked by the present process. Moreover, petroleum fractions such as kerosene, naphtha, gas oil, fuel oil, recycle oil, waxes, etc., may be treated by this process. In addition, substituted hydrocarbons such as lauryl chloride, oleyl chloride, octyl chlorides, or similar halides or oxygen compounds such as oleic acid, oleyl alcohol, lauric acid, lauryl alcohol, salicyl alcohol, salicylic acid, benzoic acid, benzyl alcohol or other alcohols, acids or halides may be cracked by means of fast or high energy neutrons. The following examples are illustrative.

*Example 1*

Seventeen parts by volume of previously purified benzene were placed in an aluminum tube extending into a well which extends into the central portion of the deuterium oxide moderated neutronic reactor described in the above-mentioned Fermi-Szilard application. The benzene was disposed in the interior of the reactor and was therefore exposed to the irradiation by neutrons ranging from about 0.03 to one or more million electron volts as well as to beta and gamma irradiation. The exposure was continued for a period during which the reactor released about 2.5 megawatt days and the temperature of the reactor during this period did not exceed about 70° C.

During bombardment 3.2 parts by volume (standard conditions) of gaseous products were evolved. Two thirds of the gas formed was found to be hydrogen. The remainder of the gas comprised a mixture of gaseous aliphatic hydrocarbons.

Following bombardment the liquid was distilled and found to contain 0.8 per cent by weight (based upon the initial benzene treated) of a high molecular weight hydrocarbon polymer. The liquid after distillation and condensation was largely benzene together with a small amount of liquid reaction product containing biphenyl and other polyphenyls. The liquid condensate had an index of refraction ($N_D{}^{20°\ C.}$) 1.5021 and a bromine number of 0.80.

Example 2

The process of Example 1 was repeated using purified cyclohexane, cyclohexene and tetralin in lieu of benzene with the following results:

| Comp. Bombarded | Pts. by Volume treated | Liq. Product Secured | | Polymer formed, percent by wgt. of initial comp. | Pts. by Vol. of gas formed (std. cond.) | Percent of Hydrogen in gas (by vol.) | Percent of Hydrocarbon in gas (by vol.) |
|---|---|---|---|---|---|---|---|
| | | $N_D^{20°}$ C. | Bromine No. | | | | |
| Cyclohexane | 14.0 | 1.4280 | 2.3 | 2.4 | 68.7 | 99 | 1 |
| Cyclohexene | 13.8 | 1.4480 | 205 | 2.1 | 15.6 | 90.3 | 9.7 |
| Tetralin | 11.5 | 1.5425 | 1.5 | 1.2 | 7.5 | 97 | 3 |

In this example, rupture of both carbon-carbon and carbon-hydrogen took place. However, selective rupture of the carbon-hydrogen bonds, to produce still more unsaturated compounds, can be effected by conducting the bombardment using neutrons having energies of 5 to 12 electron volts.

In accordance with a further modification, the cracking operation herein contemplated may be carried out in conjunction with other reactions for the purpose of producing other products. For example, the neutronic bombardment herein contemplated may be conducted using a mixture of the hydrocarbon or other compound such as propane, isobutane, benzene, toluene, cyclopentadiene, kerosene, etc., and a halogenating agent such as HCl, HBr, HF, $Cl_2$, $Br_2$, I, $F_2$, $PCl_3$, $PCl_5$, $COCl_2$, $CHCl_3$, $CCl_4$, etc. Such treatment may be effected by bombarding a gaseous mixture of the reactants or where the hydrocarbon to be treated is liquid, a solution of the halogenating agent in the liquid may be treated.

In addition irradiation of hydrocarbons may be effected in the presence of other types of agents capable of effecting a replacement of hydrogen or addition to an unsaturated double bond. For example, the reaction may be conducted in the presence of sulphuric or sulphurous acid, $SO_2$ or sulphur, in amount sufficient to form substantial quantities of sulphonates, sulphides, etc. Likewise, the bombardment may be conducted in the presence of oxygen or a peroxy compound in amount sufficient to form aldehydes, acids and/or alcohols depending upon the degree of oxidation desired. Additional hydrogen may be introduced particularly where aromatic compounds are bombarded to facilitate formation of alkyl compounds. Thus naphthalene may be bombarded in the presence of hydrogen under several atmospheres pressure to form, for example, alkyl benzenes or alkyl cyclohexanes.

Although the present invention has been described with particular reference to the specific details of certain embodiments thereof it is not intended that such details shall be regarded as limitations upon the scope of the invention except insofar as included in the accompanying claims.

What is claimed is:

A process for the preparation of hydrogen and a polymer from cyclohexane which comprises introducing into a reactor cyclohexane whereby it is bombarded by neutrons having an energy level of about .03 to several million electron volts and hydrogen is evolved, maintaining the cyclohexane in the reactor at a maximum temperature of 70° C. until the reactor containing the cyclohexane released about 2.5 megawatt days of energy, recovering the evolved hydrogen, removing from the reactor the neutron-irradiated cyclohexane product, and fractionating said product to obtain a polymer fraction.

References Cited in the file of this patent

UNITED STATES PATENTS

| 1,627,938 | Lingley | May 10, 1927 |
| 2,344,900 | Reeves et al. | Mar. 21, 1944 |
| 2,405,935 | Anderson | Aug. 20, 1946 |

FOREIGN PATENTS

| 114,150 | Australia | May 2, 1940 |
| 233,011 | Switzerland | Oct. 2, 1944 |

OTHER REFERENCES

Science, "Direct Synthesis of Higher From Lower Hydrocarbons" vol. 60, No. 1555 (Oct. 17, 1924) pp. 364–365.

Schoepfle et al.—Industrial & Eng. Chem. "Gaseous Products From Action of Cathode Rays of Hydrocarbons," vol. 23, No. 12, (December 1931) pp. 1396–1397.

Lind et al.—The Electrochemical Society, preprint 59–5, "The Action of Electrical Discharge on Gaseous Hydrocarbons" (Apr. 27, 1931) pp. 33–40.

Dunning et al.—Physical Review, "Interaction of Neutrons With Matter," vol. 48 (Aug. 1, 1935) pp. 265-280.

Nature, 136, 1026 (1935).

Proc. Phys. Soc. (London, 50, 438–440 (1938).

Nature, 143, pg. 640 (1939).

Power, pp. 56–59 (July 1940).